(12) United States Patent
Lundblad et al.

(10) Patent No.: US 8,956,092 B2
(45) Date of Patent: Feb. 17, 2015

(54) DEVICE AND METHOD FOR MILLING OF MATERIALS

(75) Inventors: Mikael Lundblad, Gävle (SE); Anders Liljerehn, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 1135 days.

(21) Appl. No.: 12/801,010

(22) Filed: May 17, 2010

(65) Prior Publication Data

US 2010/0296889 A1 Nov. 25, 2010

(30) Foreign Application Priority Data

May 25, 2009 (SE) ........................................ 0950366

(51) Int. Cl.
  *B23Q 11/00* (2006.01)
  *B23C 5/00* (2006.01)
  *B23C 5/10* (2006.01)
(52) U.S. Cl.
  CPC ............ *B23Q 11/0039* (2013.01); *B23C 5/003* (2013.01); *B23C 5/109* (2013.01); *B25D 2222/06* (2013.01)
  USPC ............ 409/131; 409/141; 409/136; 408/143
(58) Field of Classification Search
  USPC ................ 408/143, 203.5; 409/141, 131, 132, 409/212, 232, 234; 188/379; 73/11.04, 579
  See application file for complete search history.

(56) References Cited

U.S. PATENT DOCUMENTS

| | | | | | |
|---|---|---|---|---|---|
| 2,051,954 | A | * | 8/1936 | Leland | ........................... 408/143 |
| 2,133,867 | A | | 10/1938 | Lucas | |
| 2,960,189 | A | * | 11/1960 | Osburn | ........................ 188/381 |
| 3,207,009 | A | * | 9/1965 | Carlstedt | ........................ 408/143 |
| 3,220,030 | A | * | 11/1965 | Supernor | ........................ 408/127 |
| 3,230,831 | A | * | 1/1966 | Harker | ........................... 409/141 |
| 3,230,833 | A | * | 1/1966 | Shurtliff | ........................ 409/141 |
| 3,447,402 | A | * | 6/1969 | Ray | ............................... 408/143 |

(Continued)

FOREIGN PATENT DOCUMENTS

| | | |
|---|---|---|
| CN | 2093715 U | 1/1992 |
| CN | 1185126 A | 6/1998 |

(Continued)

OTHER PUBLICATIONS

Tlusty, "Dynamics of High-Speed Milling," *Journal of Engineering for Industry*, vol. 108, May 1986, pp. 59-67.

(Continued)

*Primary Examiner* — Christopher M Koehler
(74) *Attorney, Agent, or Firm* — Morgan, Lewis & Bockius LLP

(57) ABSTRACT

Device and method for milling of materials including a milling cutter body including a first end portion and an opposite second end portion. The first end portion is connected to a rotatable spindle and the second end portion is provided with at least one cutting edge. The milling cutter body defines a longitudinal axis and is provided with an axial recess, wherein at least one mass element is arranged in the recess. The axial position of the mass element in relation to the milling cutter body is tuned by use of tuning members included in the device for the tuning of the natural frequency of the device. The mass element is axially locked in relation to the milling cutter body by use of lock members included in the device, in order to optimize the natural frequency of the device for the milling operation in question.

18 Claims, 5 Drawing Sheets

(56) References Cited

U.S. PATENT DOCUMENTS

| | | | |
|---|---|---|---|
| 3,464,098 A | 9/1969 | Moore et al. | |
| 3,559,512 A * | 2/1971 | Aggarwal | 408/143 |
| 3,598,498 A * | 8/1971 | Holmen | 408/143 |
| 3,601,229 A * | 8/1971 | Shurtliff | 188/380 |
| 3,690,414 A * | 9/1972 | Aggarwal et al. | 188/378 |
| 3,774,730 A | 11/1973 | Maddux | |
| 3,838,936 A * | 10/1974 | Andreassen et al. | 408/143 |
| 3,938,626 A * | 2/1976 | Hopkins | 188/378 |
| 4,047,469 A | 9/1977 | Sakata | |
| 4,130,185 A * | 12/1978 | Densmore | 188/378 |
| 4,616,738 A * | 10/1986 | Shurtliff | 188/380 |
| 5,170,103 A * | 12/1992 | Rouch et al. | 318/128 |
| 5,518,347 A * | 5/1996 | Cobb, Jr. | 409/141 |
| 5,700,116 A * | 12/1997 | Cobb, Jr. | 409/141 |
| 5,810,528 A * | 9/1998 | O'Connor et al. | 409/141 |
| 5,957,016 A | 9/1999 | Segalman et al. | |
| 6,076,999 A | 6/2000 | Hedberg et al. | |
| 6,443,673 B1 * | 9/2002 | Etling et al. | 408/1 R |
| 6,477,927 B1 | 11/2002 | Albo et al. | |
| 6,595,727 B2 | 7/2003 | Arvidsson | |
| 6,619,165 B2 * | 9/2003 | Perkowski | 82/160 |
| 6,694,213 B2 * | 2/2004 | Claesson et al. | 700/169 |
| 6,945,740 B2 | 9/2005 | Svenningsson et al. | |
| 7,028,997 B2 * | 4/2006 | Takahashi et al. | 267/137 |
| 7,029,209 B2 * | 4/2006 | Cardemon et al. | 408/1 R |
| 7,938,599 B2 | 5/2011 | Takiguchi et al. | |
| 8,529,173 B2 * | 9/2013 | Hoefler | 409/141 |
| 2003/0147707 A1 * | 8/2003 | Perkowski | 407/30 |
| 2005/0214087 A1 | 9/2005 | Agapiou et al. | |
| 2006/0275090 A1 | 12/2006 | Onozuka et al. | |
| 2006/0291973 A1 * | 12/2006 | Claesson et al. | 409/234 |
| 2008/0226401 A1 * | 9/2008 | Hoefler et al. | 407/34 |
| 2008/0298912 A1 | 12/2008 | Schmitz et al. | |
| 2009/0187270 A1 * | 7/2009 | Hoefler | 700/177 |
| 2010/0061820 A1 * | 3/2010 | Haimer | 408/143 |
| 2010/0310334 A1 * | 12/2010 | Inoue et al. | 409/131 |
| 2011/0103903 A1 | 5/2011 | Sjöö | |
| 2011/0116883 A1 * | 5/2011 | Lin | 408/143 |
| 2011/0182679 A1 | 7/2011 | Bierl et al. | |
| 2011/0229278 A1 | 9/2011 | Sjöö | |
| 2013/0004250 A1 | 1/2013 | Gamble | |

FOREIGN PATENT DOCUMENTS

| | | |
|---|---|---|
| CN | 1390666 A | 1/2003 |
| JP | 63-123654 | 5/1988 |
| JP | 2005-329509 | 12/2005 |
| JP | 2009-226548 | 10/2009 |
| JP | 2009-233800 | 10/2009 |
| SU | 214343 A | 10/1984 |
| WO | WO 02/45892 | 6/2002 |
| WO | 2006/010093 | 1/2006 |
| WO | WO 2008/002145 | 1/2008 |

OTHER PUBLICATIONS

Smith, et al.; "An Overview of Modeling and Simulation of the Milling Process," *Journal of Engineering for Industry*, vol. 113, May 1991, pp. 169-175.

Hoefler; "Time Domain Simulations of Metal-Cutting Systems with Experimental Verification," Thesis submitted to the Department of Mechanical Engineering at Northern Illinois University, Dec. 1997.

E. Leigh et al., "Applying High-Speed Machining Techniques on Rotor Grip Configurations," *AHS International*, Presented at the American Helicopter Society 55th Annual Forum, May 25-27, 1999, Montreal, Canada, pp. 1-16.

"Metalmax," [Online] Manufacturing Laboratories, Inc. 2001 [retrieved on Jan. 21, 2009]. Retrieved from the Internet: <www.mfg-labs.com>.

E. Leigh et al., "Advanced Machining Techniques on Titanium Rotor Parts," *AHS International*, Presented at the American Helicopter Society 55th Annual Forum, May 2-4, 2000, Virginia Beach, VA, pp. 1-19.

P. Darcy, "Productivity Improvements Through Collaboration," Presented at the American Helicopter Society 58th Annual Forum, Jun. 11-13, 2002, Montreal, Canada, pp. 1-12.

P. Zelinski, "Find the Right Speed for Chatter-Free Milling," [Online] *Modern Machine Shop*, [Retrieved on Oct. 25, 2007], pp. 1-2. Retrieved from the Internet: <http://www.mmsoline.com/articles/article_print1.cfm>.

Smith, "Reasons for stable milling zones," *Cutting Tool Engineering*, vol. 64, Issue 10, Oct. 2012, pp. 24-25.

Smith, "The science of milling sounds," *Cutting Tool Engineering*, vol. 65, Issue 2, Feb. 2013, pp. 20-21.

P. Zelinski, "The Overhang Effect," [Online] *Modern Machine Shop*, pp. 1-5. Retrieved from the Internet: <www.mmsonline.com>.

P. Zelinski, "Maximum Aluminum," [Online] *Modern Machine Shop*, pp. 1-6. Retrieved from the Internet: <www.mmsonline.com>.

P. Zelinski, "High Speed Machining: Aerospace Boeing's One Part Harmony," [Online] *Modern Machine Shop*, pp. 1-8. Retrieved from the Internet: <www.mmsonline.com>.

Notice of Reasons for Rejection (with English translation) for Japanese Patent Application No. 2010-118029, dated Mar. 4, 2014.

First Office Action dated Aug. 5, 2013 (with English translation) for Chinese Application No. 201010185374.7.

Second Office Action dated Mar. 24, 2014 (with English translation) for Chinese Application No. 201010185374.7.

\* cited by examiner

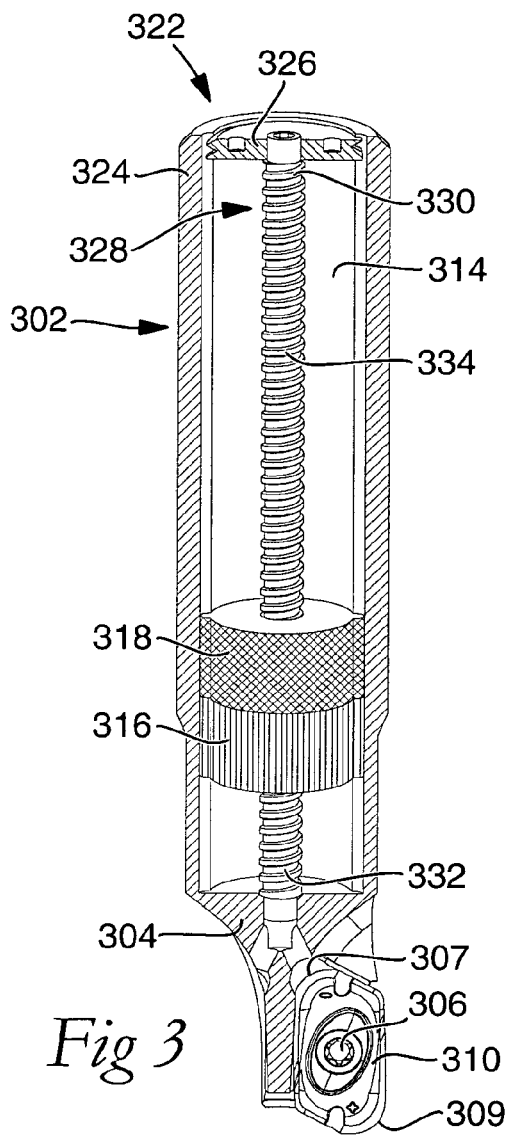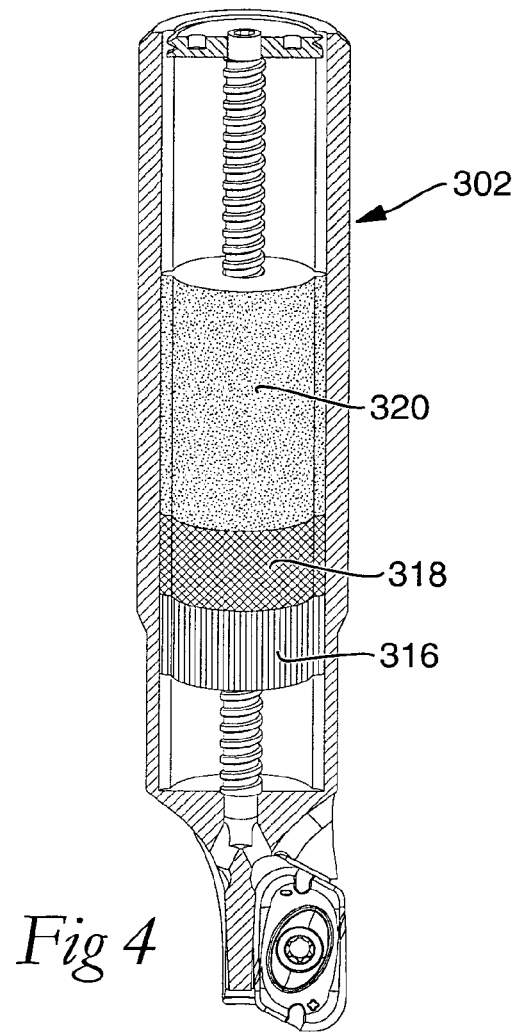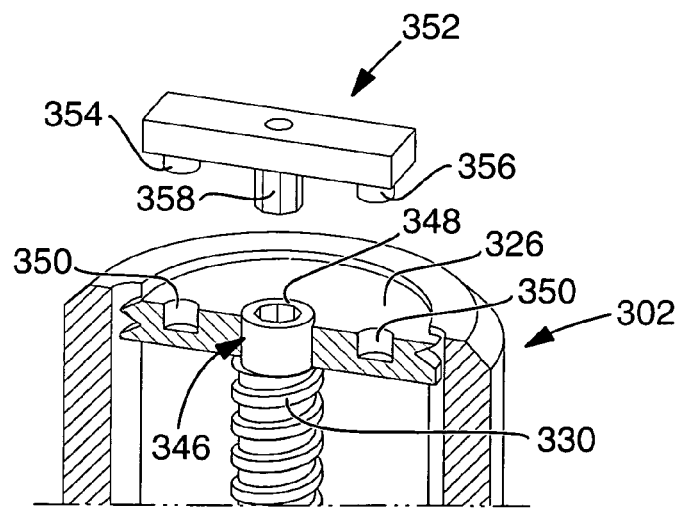

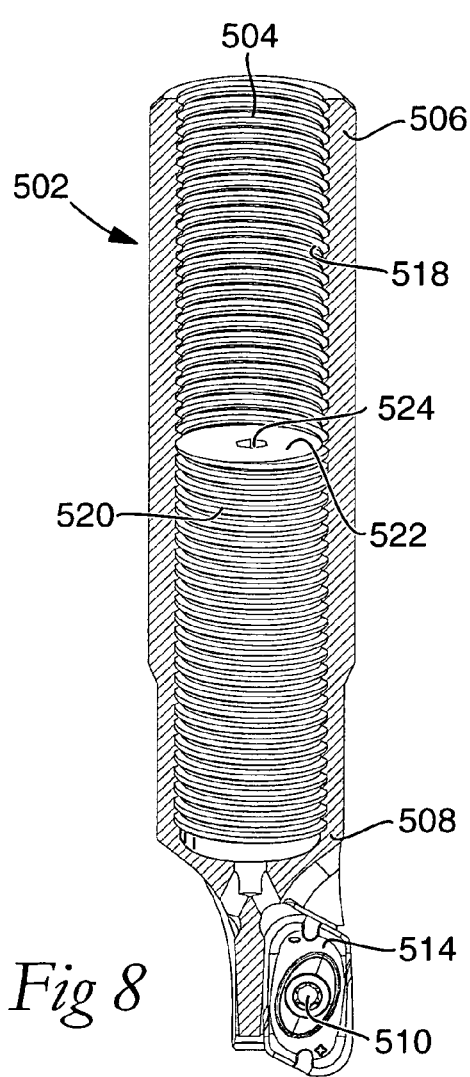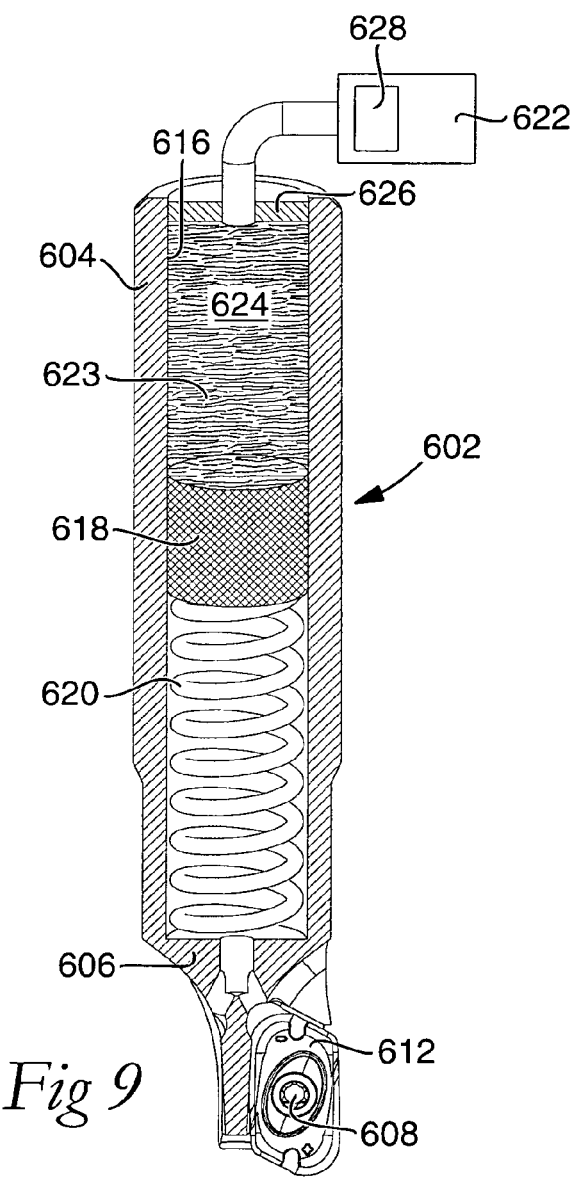

DEVICE AND METHOD FOR MILLING OF MATERIALS

CROSS-REFERENCE TO PRIOR APPLICATION

This application claims priority to Swedish Application No. 0950366-5 filed May 25, 2009, which is incorporated by reference herein.

TECHNICAL FIELD

The present disclosure relates to a method and a device for milling of materials, for instance, titanium, aluminium, casting or another material. The device includes a milling cutter body including a first end portion and an opposite second end portion. The first end portion is connectable to a rotatable spindle or holder and the second end portion is provided with at least one cutting edge or mounting member for mounting at least one milling insert having at least one cutting edge. The milling cutter body defines a longitudinal axis, which extends through the first and second end portion, and is provided with an axial recess and at least one mass element arranged in the recess.

BACKGROUND ART

In milling, the performance of the milling is largely determined by the combined natural frequencies of the assembled system, which includes a machine, a rotatable spindle or holder mounted to the machine, and a milling cutter body that is connected to the spindle and has one or more cutting edges. The cutting edges may be integrated with the milling cutter body or the milling cutter body is provided with one or more replaceable milling inserts each one of which is provided with one or more cutting edges. Elongate milling cutter bodies, in particular when mounting with a great protrusion length, have a tendency to cause a poor and irregular finish of the surface in the milled material, caused by so-called chatter, which may appear as waves on the milled surface of the workpiece.

For a specific spindle speed, including, for example, the number of revolutions per time unit of the spindle, there is a critical axial cutting depth and in case of cutting depths that are greater than the critical axial cutting depth, too great vibrations arise to be able to carry out a stable milling operation. If the speed of the spindle is changed, the critical axial cutting depth will change. Thus, it is important to select a combination of axial cutting depth and spindle speed where stability problems are avoided. However, it is not always possible to change the spindle speed to avoid stability problems, which may at least be due to speed control limitations in the machine and/or because increased cutting speed may cause higher temperature in the cutting zone, which in turn results in faster tool wear.

In prior art, there are several solutions that try to solve the problem of chatter vibrations and stability problems in cutting operations such as drilling, turning and milling.

U.S. Pat. No. 5,700,116 discloses a damping system to damp vibrations that are generated during, for example, milling, wherein an elongate tool body, to which milling inserts are mounted, is provided with an axial hole in which a damper mass is arranged. The damper mass is suspended by means of elastic O-rings, and the tuning of the damping system is provided by altering the pressure on the O-rings.

U.S. Pat. No. 3,447,402 discloses a system for drilling comprising a drill body provided with an axial central hole in which a damper mass is suspended by use of ring-shaped, elastic elements, wherein the damper mass is intended to vibrate to damp the vibrations of the system.

U.S. Pat. No. 3,774,730 discloses a drill body provided with a cavity in which a damper mass is suspended by resilient O-rings to allow the displacement of the damper mass in relation to the drill body damp vibrations in the drill body.

U.S. Pat. No. 3,838,936 discloses a damper device for a drill body comprising a damper mass contained in an axial hole arranged in the drill body, the damper mass being suspended by resilient rubber rings to damp undesired vibrations. The damping is adjusted by the pressure on the rubber rings being adjusted.

U.S. Pat. No. 5,957,016 discloses a method for controlling the chatter vibrations in a cutting tool system, wherein the natural frequency of the system is modulated by piezo-electric materials, electrorheological fluids, fields of sinusoidal shape and/or signals of square-wave shape.

U.S. Pat. No. 4,047,469 discloses a method to damp chatter vibrations in, for example, a milling cutter by applying a rotating damper mass in contact with the cutting tool or the spindle and continuously displacing the damper mass along the cutting tool or the spindle to shift the contact pressure and thereby change the natural frequency of the system to suppress the chatter vibrations.

US 2006/0291973 discloses a system to reduce the vibrations in a cutting tool, wherein the body on which the cutting tool is mounted is provided with an axial cavity in which a damper mass is displaceably suspended by elastic rings.

WO 2006/010093 discloses a method for damping chatter vibrations in tool systems, wherein calibration weights are attached to a tool holder in the system to adjust the natural frequency of the holder.

U.S. Pat. No. 3,559,512 discloses a system to damp vibrations during drilling, wherein the drill body has a central axial hole in which a set of damper masses are suspended by ring-shaped, elastic damping elements.

U.S. Pat. No. 3,938,626 discloses a structure to damp vibrations, wherein a drill body has an axial cavity in which a set of damper masses are displaceably suspended by a bar extending axially in the cavity.

U.S. Pat. No. 5,170,103 discloses a device to reduce chatter vibrations in cutting tool systems, wherein a body mounted on a holder is provided with an axial cavity, and wherein a damper mass arranged in the cavity is displaceably suspended by an elastic element.

However, the methods and apparatuses mentioned above do not provide sufficiently flexible and efficient solutions to efficiently overcome stability problems and vibration problems in milling.

SUMMARY

Accordingly, it is desired to provide an improved and more efficient milling of materials, such as titanium, aluminium, casting or another material, wherein vibration problems are avoided or reduced considerably. The present disclosure provides embodiments of devices and methods of milling that considerably reduce or avoid vibration problems.

In one embodiment, the device for milling of materials includes a milling cutter body having a first end portion and an opposite second end portion. The milling cutter body at the first end portion being connectable to a rotatable spindle or holder and at the second end portion being provided with at least one cutting edge or mounting member for mounting of at least one milling insert having at least one cutting edge. The milling cutter body defines a longitudinal axis, which extends through the first and second end portion, and is provided with an axial recess and at least one mass element arranged in the recess. The mass element is axially tunable in relation to the milling cutter body by use of tuning members included in the device for the tuning of the axial position of the mass element in relation to the milling cutter body and thereby tuning of the natural frequency of the device. The mass element is axially lockable in relation to the milling cutter body in a tuned position by means of lock members included in the device for axial locking the mass element so that its axial displacement in relation to the milling cutter body is prevented during the milling operation, in order to optimize the natural frequency of the device for the milling operation in question.

An exemplary method for milling of materials using a milling cutter body that includes a first end portion and an opposite second end portion, the first end portion connected to a rotatable spindle or holder and the second end portion being provided with at least one cutting edge or mounting member for mounting at least one milling insert having at least one cutting edge, and the milling cutter body defining a longitudinal axis, which extends through the first and second end portion, and is provided with an axial recess. The method includes the steps of at least one mass element being arranged in the recess; tuning the axial position of the mass element in relation to the milling cutter body by means of tuning members included in the device for the tuning of the natural frequency of the device; and axial locking of the mass element in relation to the milling cutter body in a tuned position by means of lock members included in the device, by which the axial displacement of the mass element in relation to the milling cutter body is prevented during the milling operation, in order to optimize the natural frequency of the device for the milling operation in question.

As is seen in FIG. 1 and the appurtenant description in the detailed description, the critical axial cutting depth of a certain assembled milling system may be described by a stability diagram that reveals several stability lobes where the combination of axial cutting depth and spindle speed should be below the plotted curve to avoid stability problems. In those cases where there are limitations on spindle speed, the inventors have discovered that a displacement of the stability lobes can afford an increase of the critical axial cutting depth without needing to change the spindle speed, and thereby a more efficient milling is attained without stability problems. There is also an advantage to displace stability lobes from higher spindle speed ranges down to a desired spindle speed, in that the stability lobes are both higher and wider the higher the spindle speed is.

Since the stability lobes coincide with the most dominant natural frequency or with a combination of the two most dominant natural frequencies of the assembled system, the displacement of the stability lobes can be attained by a displacement or adjustment of the natural frequencies of the system. What controls the natural frequencies of a structure is the stiffness and mass thereof. In a milling cutter body, one end of which is fixedly mounted in a spindle and the other end of which is free, the stiffness concept embraces, among other things, the protrusion length of the milling cutter body, the modulus of elasticity of the material of the milling cutter body and the diameter of the milling cutter body. In the milling area, there are application limits on the diameter, protrusion length and material and other parameters of the milling cutter body that cannot be varied to a greater extent. Therefore, the present disclosure displaces or adjusts the natural frequencies by moving the mass distribution in the milling cutter body in the way that is defined in the accompanying claims. In this way, an efficient way is attained to adjust the natural frequencies of the assembled system to optimize the natural frequencies of the milling operation in question so that an optimum combination of spindle speed and axial cutting depth can be used during the milling, for example, that a deepest possible cutting depth at a desired spindle speed is attained without stability problems and chatter vibrations. Thus, an improved and more efficient stable milling of materials, such as titanium, aluminium, casting or another material, is provided, wherein vibration problems and also chatter vibrations are avoided in a more efficient way in comparison with prior art. Very good results have been obtained from running tests on the disclosed device and method.

The present disclosure does not involve damping of arisen vibrations during milling or adjustment of the damping by a damper mass that is suspended in the milling cutter body and allowed to be displaced or vibrate, but the present disclosure does involve displacement or regulation of the natural frequencies of the device by the axial tuning and the axial locking of said mass element to optimize the natural frequencies of the milling operation in question and thereby avoid vibration problems.

The mass/weight, stiffness by different choices of material, and axial extension of the mass element may be varied to optimize the tuning of the natural frequencies of the device.

With mass element, reference is here made to an element, the mass of which in relation to the mass of the milling cutter body is such that the mass element has a qualitative, or considerable, effect on the performance of the milling cutter body, or of the device provided with a milling cutter body, such as a milling cutter tool, when running, such as during the milling operation.

The milling cutter body and one or more cutting edges may be formed from one and the same piece, or the milling cutter body may be provided with said mounting members for mounting of at least one milling insert, such as one milling insert or a plurality of milling inserts, having one or more cutting edges. There are several suitable variants of said mounting members in prior art, where several variants are seen in the detailed description.

According to an advantageous embodiment of the device, the recess is adapted to receive two or a plurality of mass elements, and each mass element is axially tunable and axially lockable by means of said tuning members and lock members. In this way, flexibility is obtained as for the tuning of the natural frequencies of the device and different masses can easily be obtained in order to optimize the natural frequency of the milling operation in question, by means of which the milling becomes further improved and still more efficient.

According to an additional advantageous embodiment of the device, the respective mass element is replaceably arranged in the recess. This contributes further to flexibility regarding the tuning of the natural frequencies of the device, since a mass element can be replaced by a mass element of higher or lower weight, a mass element of stiffer or less stiff material, or a mass element having greater or smaller axial extension, and thus the milling becomes even more efficient.

According to another advantageous embodiment of the device, the respective mass element is radially lockable in relation to the milling cutter body by means of lock members included in the device for radial locking of the mass element so that its radial motion in relation to the milling cutter body is prevented. By locking the mass element in the radial direction, the inventors have realized that the optimization of the natural frequencies of the device becomes even more efficient. Radial locking of the mass element is attained, for example, by the fact that the radial extension of the mass element corresponds to the internal cross-section of the recess so that the mass element contacts the inner wall of the recess. Additional examples of radial locking of the respective mass element are seen in the detailed description of embodiments.

According to another advantageous embodiment of the device, the recess embraces an axial hole. Advantageously, the axial hole is centrally placed in the milling cutter body. The axial hole offers an efficient locking of the mass element both axially and radially, and an efficient tuning of the axial position of the respective mass element, whereby a more efficient tuning of the natural frequencies of the device is obtained and thereby a more efficient milling.

According to yet an advantageous embodiment of the device, the axial hole is provided with an opening at the first or second end portion for feeding in and feeding out of the respective mass element. This gives an efficient adjustment of the mass that is formed of the at least one mass element and thereby a more efficient tuning of the natural frequencies of the device and a more efficient milling.

According to an advantageous embodiment of the device, wherein the recess embraces an axial hole, said tuning members comprise a driving member arranged in the axial hole between the mass element and one of the end portions and adapted to drive the mass element toward the opposite end portion, and pressurizing members adapted to pressurize the space of the axial hole between the opposite end portion and the mass element in order to drive the mass element from the opposite end portion. Said driving member may, for example, be in the form of a spring member. The axial position of the mass element is accordingly adjusted by the fact that the pressurizing member changes the pressure in said space, and the pressure in said space can be established by a suitable pressurized medium, such as a medium in a gas state or liquid state. By this embodiment, the axial position of the mass element can be adjusted during the proper milling operation while the milling cutter body rotates, which facilitates the tuning and the optimization of the natural frequencies of the device, whereby the milling is made still more efficient.

According to an additional advantageous embodiment of the device, said pressurizing members are adapted to pressurize the axial hole by means of liquid. Advantageously, the liquid is in the form of cooling liquid that is used to cool the cutting zone, which provides co-ordination benefits since the same duct system is used for both the tuning of the mass element and the cooling of the cutting zone. The liquid for the axial tuning of the mass element and the cooling liquid may also be conveyed by two separated systems.

According to another advantageous embodiment of the device, the driving member is arranged between the second end portion and the mass element, and said pressurizing members are adapted to pressurize the space of the axial hole between the mass element and the first end portion. This is an advantageous embodiment since the same duct system is used for both the tuning of the mass element and the cooling of the cutting zone, which contributes to an efficient tuning of the mass element.

According to yet an advantageous embodiment of the device, said tuning members comprise first threaded members anchored and axially locked in the milling cutter body, and second threaded members that, together with the mass element, are axially displaceable in relation to the milling cutter body. The first and second threaded members engage each other and their co-operation displaces the mass element axially in relation to the milling cutter body. In this way, an uncomplicated and efficient tuning is obtained of the axial position of the mass element, and accordingly an efficient optimization of the natural frequencies of the device and an efficient milling of materials are attained. The respective threaded members may be in the form of one or more threads.

According to an advantageous embodiment of the device, wherein said tuning members comprise threaded members, said tuning members comprise a bar that extends axially in the recess, the bar being provided with the first threaded members, being rotatably anchored in the milling cutter body, and being axially rotatable in relation to the milling cutter body. According to another advantageous embodiment, the axial bar is hollow and defines a duct adapted to receive and convey cooling liquid to the second end portion and/or said mounting members to cool the cutting zone. In this way, an efficient conveyance of cooling water is also attained. According to an additional advantageous embodiment of the device, the mass element is axially displaceable by the rotation of the axial bar, and said lock members comprise lock elements for locking of the axial bar in the direction of rotation in relation to the milling cutter body for prevention of the rotation of the axial bar. In this way, an efficient axial locking of the mass element is obtained and its axial displacement in relation to the milling cutter body is prevented. According to an advantageous embodiment of the device, wherein said tuning members comprise an axially extending bar, said tuning members comprise guiding members for guiding the respective mass element in a strictly axial direction to prevent the rotation, of the mass element in relation to the milling cutter body, which further contributes to an efficient axial tuning and axial locking of the respective mass element.

According to an additional advantageous embodiment of the device, wherein said tuning members comprise threaded members, the inner wall of the recess is provided with the first threaded members. When the inner wall of the recess is provided with the first threaded members, the respective mass element is advantageously provided with the second threaded members, whereby the first and second threaded members also constitute said lock members. Alternatively, a locking washer may be provided with the second threaded members, the locking washer being adapted to be placed between one of the end portions and the mass element and driving members arranged between the mass element and the opposite end portion being adapted to drive the mass element toward the locking washer, whereby the mass element is axially locked.

Said lock members may also be formed in other ways. The walls of the milling cutter body and the mass element may be provided with co-operating peripheral openings adapted to receive a locking pin to provide an axial locking of the mass element. The mass element may also be locked by a fully hydraulic locking.

According to an advantageous embodiment of the method, two or a plurality of mass elements are arranged in the recess, the axial position of each mass element in relation to the milling cutter body being tuned and each mass element being locked in relation to the milling cutter body in a tuned position. In this way, flexibility is obtained as for the tuning of the natural frequencies of the device and different masses can easily be obtained in order to optimize the natural frequency of the milling operation in question, whereby the milling is improved and made still more efficient.

According to an additional advantageous embodiment of the method, the respective mass element is replaceably arranged in the recess. In this way, the tuning of the natural frequencies of the device becomes more flexible since a mass element can be replaced by a mass element having other properties as has been mentioned above, and thereby the milling is made still more efficient.

According to another advantageous embodiment of the method, the method is characterized by radial locking of the respective mass element in relation to the milling cutter body by means of lock members included in the device so that its radial motion in relation to the milling cutter body is prevented. By locking the mass element in the radial direction, the inventors have discovered that the optimization of the natural frequencies of the device becomes even more efficient.

According to yet another advantageous embodiment of the method, the at least one mass element is brought to form such a mass and the axial position of the respective mass element is tuned into such a position that an optimum tuning of the natural frequency of the device is obtained for the milling operation in question.

It is to be understood that both the foregoing general description and the following detailed description are exemplary and explanatory and are intended to provide further explanation of the invention as claimed.

BRIEF DESCRIPTION OF THE DRAWINGS

A particular embodiment of the invention will be described in more detail below, reference being made to the appended drawings, on which:

FIG. 3 shows a schematic perspective view of a milling cutter body of a first embodiment of the device, as seen from the side and partly in cross-section, FIG. 4 shows a schematic perspective view of a milling cutter body of a first embodiment of the device having an extra mass element compared to the milling cutter body as shown in FIG. 3, as seen from the side and partly in cross-section, FIG. 5 shows an enlargement of the first end portion of the milling cutter body in FIGS. 3 and 4, partly in cross-section, FIG. 8 shows a milling cutter body of a third embodiment of the device, as seen from the side and partly in cross-section, FIG. 9 shows a milling cutter body of a fourth embodiment of the device, as seen from the side and partly in cross-section.

DETAILED DESCRIPTION OF PREFERRED EMBODIMENTS

Figure 1:
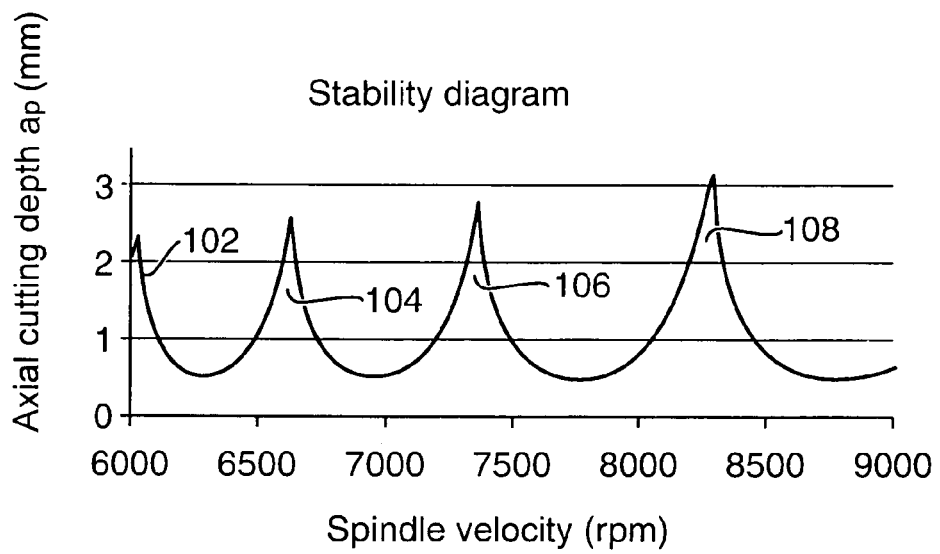
FIG. 1 schematically shows a stability diagram of a device comprising a spindle included in a machine tool, a milling cutter body and milling inserts.

FIG. 1 schematically shows a stability diagram of a device comprising a spindle included in a machine tool, a milling cutter body and milling inserts. The diagram shows maximum acceptable axial cutting depth as a function of the spindle speed and is read in the following way: if a combination of axial cutting depth and spindle speed is selected that is below the curve, stability problems are avoided, while if a combination is selected that is above the curve, the vibration levels will escalate in an uncontrolled way. As is seen from the diagram, the difference can be great between a well selected and a less well selected spindle speed, and during certain milling operations, the axial cutting depth can be doubled by a smaller adjustment of the spindle speed. However, the problem is that it is not always possible to change the spindle speed to reach a desired stability lobe 102, 104, 106, 108 because of limitations of the spindle speed of the device, or because an increased spindle speed and thereby increased cutting speed may result in increased temperature in the cutting zone, which in turn results in faster tool wear. As has previously been mentioned, there is also an advantage to displace stability lobes 102, 104, 106, 108 from higher frequency ranges down to a desired frequency since the stability lobes are both higher and wider the higher the frequency is. Since the stability lobes coincide with the first natural frequency or with a combination of the two first natural frequencies of the assembled system, the displacement of the stability lobes can be attained by a displacement or adjustment of the natural frequencies of the device. The inventors have discovered that a shift of the mass distribution in the milling cutter body according to the present disclosure is an efficient way to adjust the natural frequencies of the device, and in the subsequent description, several embodiments are described to carry out this.

Figure 2:
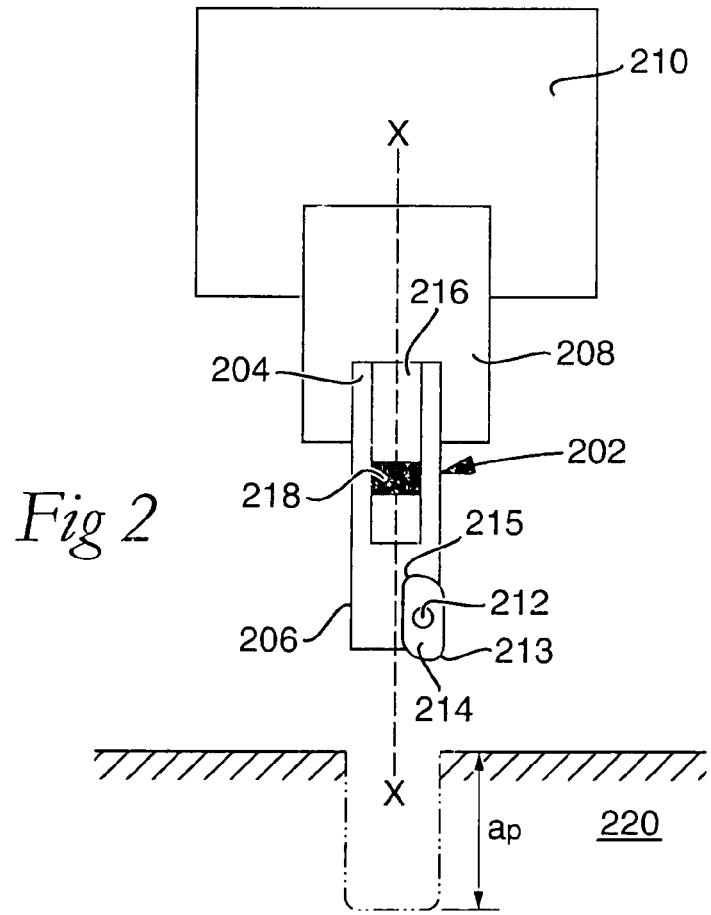
FIG. 2 shows a schematic view illustrating an embodiment of the device, partly in cross-section.
Figure 6:
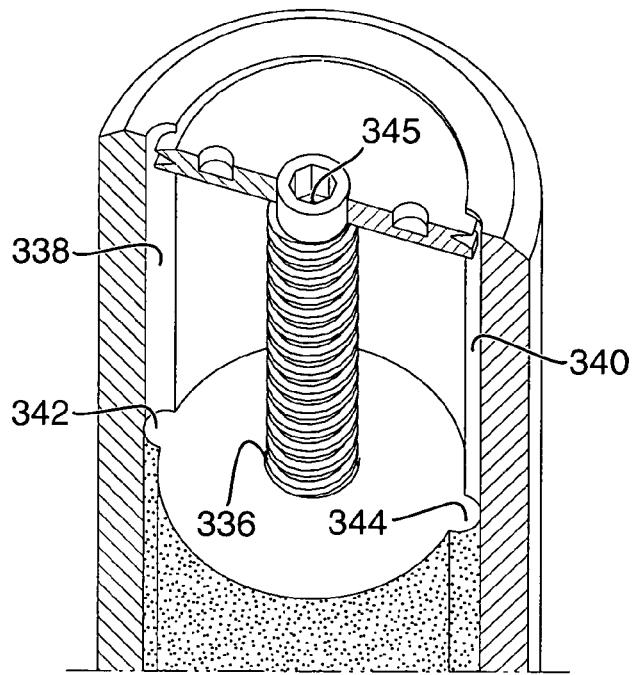
FIG. 6 shows a schematic perspective view of the milling cutter body in FIGS. 3-4 as seen from the spindle.

FIG. 2 shows a schematic view illustrating an embodiment of the device for milling of materials 220, for instance, titanium, aluminium, casting or another material. The device, according to this embodiment in the form of a tool, more precisely a milling cutter, for chip removing metal machining, includes an elongate milling cutter body 202, for instance of steel, having a first end portion 204 and an opposite second end portion 206, wherein the milling cutter body 202 at the first end portion 204 is mountable in a rotatable spindle 208, which in turn is rotatably mounted on a stationary part 210 of the device, and thereby the milling cutter body 202 is rotatable with the spindle 208. At the second end portion 206, the milling cutter body 202 is provided with mounting members 212 for mounting of at least one milling insert 214, or tooth, peripherally on the milling cutter body 202 in a pocket intended for this purpose. Here, the milling insert 214 is provided with two cutting edges 213, 215 and is accordingly indexable into two different active positions, but may be provided with only one or more than two cutting edges. In practice, the milling insert is usually manufactured from cemented carbide or another equivalent material having great hardness and wear resistance. According to an embodiment, the mounting members include a conventional fixing screw having an external thread and intended to be brought through a central hole in the milling insert and be received by as well as engage with an internally threaded hole in the pocket. According to another embodiment, the mounting members include a clamp for the fixation of the milling insert in the pocket.

The milling cutter body 202 defines a longitudinal axis x-x, which also subsequent milling cutter bodies do in a corresponding way, that extends through the first and second end portion 204, 206 and the milling cutter body 202 is provided with an axial hole 216 and a mass element 218, for example, of Densimet, which is a tungsten alloy, or another material of high density, that is arranged in the axial hole 216 and constitutes a considerable mass in relation to the mass of the milling cutter body. It may be mentioned that the density of the mass element may be higher as well as lower than the density of the milling cutter body. The mass of the mass element 218 is suitably selected in consideration of the natural frequencies and natural modes of the system in question, including, for example, the milling tool mounted in a spindle of the machine. Alternatively, the mass of the mass element may be selected only in view of the properties of the milling tool. In FIG. 2, $a_p$ illustrates the axial cutting depth in the material or workpiece 220 to be milled.

The milling cutter body, including the appurtenant axial hole and mass elements, of several embodiments of the device, is described more in detail of the following, wherein the respective milling cutter body, at the first end portion thereof, is adapted to be mounted in a spindle as is shown in FIG. 2.

FIGS. 3-6 schematically show a milling tool for chip removing metal machining including an elongate milling cutter body 302 of a first embodiment of the device, wherein the milling cutter body 302 at the second end portion 304 thereof is provided with mounting members 306 for mounting of an edged milling insert 310 peripherally on the milling cutter body 302 in a pocket. Here, the milling insert 310 is provided with two cutting edges 307, 309 and is accordingly indexable into two different active positions, but may be provided with one or more than two cutting edges. The mounting members 306 for a milling insert 310 have a conventional design and embrace in this case a fastening element 306 that is adapted to engage with a recess arranged in the milling insert 310 and is anchored in a fastening hole mouthing in the bottom surface of the pocket in the milling cutter body 302, for example, by threads. The milling cutter body 302 is provided with a central axial hole 314 that extends along the longitudinal axis x-x of the milling cutter body 302. The axial hole 314 is adapted to receive a plurality of mass elements 316, 318, 320 that together constitute a considerable mass, or considerable weight, in relation to the mass of the milling cutter body so that the natural frequency of the device depends on the axial position of the mass elements 316, 318, 320 in relation to the milling cutter body 302. The mass of the mass elements 316, 318, 320 is suitably selected in consideration of the natural frequencies and natural modes of the system in question, for example, the milling tool mounted in a spindle of the machine. Alternatively, the mass of the mass elements may be selected only in view of the properties of the milling tool. The mass of the mass element should not be negligible, or very small, in relation to the mass of the milling cutter body 302, since this would mean that the natural frequency of the device is not affected substantially by different axial positioning of the mass elements. The axial hole 314 is provided with an opening 322 at the first end portion 324 for feeding in and feeding out of the respective mass element 316, 318, 320 and the opening 322 is closable by means of a tightening cover 326 that is anchored in the milling cutter body 302.

This embodiment is provided with tuning members including a rack 328 extending axially in the axial hole 314. The rack 328 is rotatable around the longitudinal axis x-x thereof, which here coincides with the longitudinal axis x-x of the milling cutter body 302, and is axially rotatable in relation to the milling cutter body 302. The first end 330 of the rack 328 is rotatably attachable to the tightening cover 326 and the second end 332 thereof is rotatably anchored in the second end portion 304 of the milling cutter body 302. Said tuning members include first threaded members 334, in the form of conventional threads, which are arranged on the rack 328 and thereby said first threaded members 334 are anchored and axially locked in the milling cutter body 302. The respective mass element 316, 318, 320 is provided with a central through hole, where the inner wall of the hole is provided with the second threaded members 336 of said tuning members, the first and second threaded members 334, 336 being adapted to engage with each other and their co-operation displacing the respective mass element 316, 318, 320 axially in relation to the milling cutter body 302. Said tuning members also comprise guiding members adapted to guide the respective mass element 316, 318, 320 in a strictly axial direction and to prevent the rotation of the mass element 316, 318, 320 in relation to the milling cutter body 302. Said guiding members comprise at least one axial groove 338, 340 and a guiding element 342, 344 complementary to the groove 338, 340 and axially displaceable in and in relation to the groove 338, 340. In this embodiment, the guiding members embrace two opposite axial grooves 338, 340 arranged in the inner wall of the axial hole 314 and adapted to engage with a guiding element 342, 344 each that is anchored on the mass element 316, 318, 320. By the tuning members described above, a mass element 316, 318, 320 is obtained that is axially tunable in relation to the milling cutter body by the rotation of the rack 328. The rotation of the rack 328 in one direction of rotation displaces the respective mass element 316, 318, 320 in the axial direction toward one of the end portions 304, 324 in relation to the milling cutter body 302 and the rotation thereof in the other direction of rotation displaces the mass element 316, 318, 320 in the axial direction in relation to the milling cutter body 302 toward the opposite end portion 304, 324, whereby the mass distribution of the milling cutter body 302 is tuned and the result becomes a tuning of the natural frequency of the device. The respective mass element 316, 318, 320 is replaceably arranged in the axial hole 314. The rack 328 is hollow and defines a duct 345 adapted to receive and convey cooling liquid to the milling insert 310 and the cutting zone.

The first embodiment includes lock members for axial locking of the mass element 316, 318, 320 and the mass element 316, 318, 320 is axially lockable in relation to the milling cutter body 302 so that its axial displacement in relation to the milling cutter body 302 is prevented during the milling operation. The lock members for the axial locking include an end element 346 fixed on the first end of the rack 328, the end element 346 having walls 348 that define a recess and define a centre axis that coincides with the axis x-x of the rack 328. The recess of the end element 346 has a non-circular cross-section. The walls 348 of the end element 346 may, for example, define a hexagonal internal cross-section. The lock members for the axial locking include furthermore an opening that is arranged in the tightening cover 326 and that receives the end element 346, and two outer depressions 350 in the tightening cover 326, which depressions 350 advantageously may be situated opposite each other on each side of the end element 346. Finally, the lock members include a pinned element 352 provided with two peripheral locking pins 354, 356 complementary to the depressions 350 and adapted to engage with the same, and a central locking pin 358 that is complementary to the recess defined by the walls 348 of the end element 346 and adapted to engage with the same. The engagement of said locking pins 354, 356, 358 with the respective recess and depression 350 locks the rack 328 in the direction of rotation in relation to the milling cutter body 302 and thereby prevents the rotation of the rack 328. By the axial tuning and the axial locking of the mass element 316, 318, 320, the natural frequency of the device is optimizable for the milling operation in question. In order to rotate the rack 328, a tool adapted to engage with the recess of the end element 346 is advantageously used, wherein the tool is rotated.

By locking members, in the form of the engagement of the first and second threaded members 334, 336 with each other, the respective mass element 316, 318, 320 is radially lockable in relation to the milling cutter body 302 so that the radial motion of the respective mass element 316, 318, 320 in relation to the milling cutter body 302 is prevented, including, for example, preventing a displacement perpendicular to the axial axis x-x. The periphery of the respective mass element 316, 318, 320 may also advantageously contact the inner wall of the axial hole 314.

Figure 7:
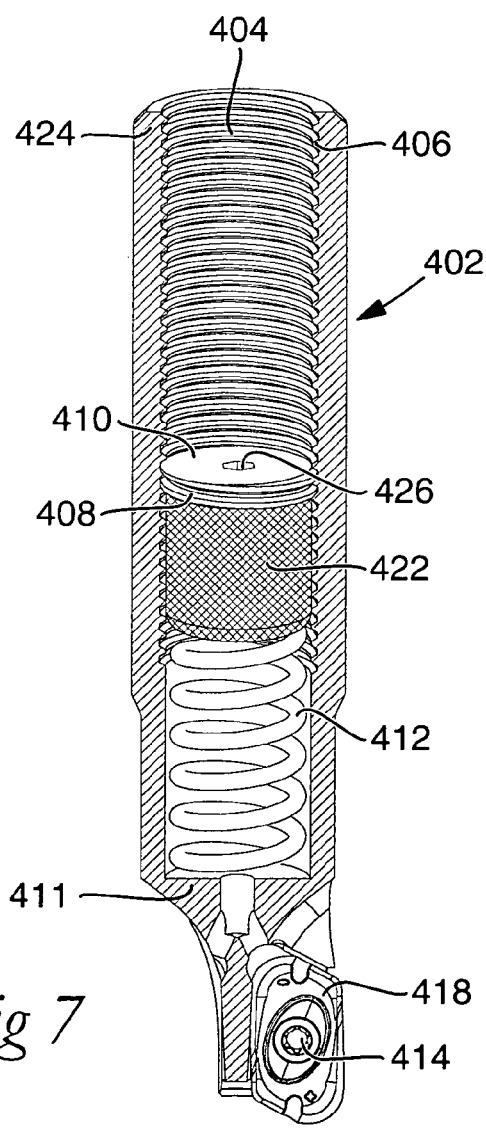
FIG. 7 shows a milling cutter body of a second embodiment of the device, as seen from the side and partly in cross-section.

FIG. 7 shows a milling cutter body of a second embodiment of the device, wherein the milling cutter body 402 is provided with a central axial hole 404. This embodiment has tuning members including first threaded members 406, in the form of conventional internal threads, which are arranged on the inner wall of the axial hole 404 and thereby anchored and axially locked in the milling cutter body 402. Said tuning members include second threaded members 408, in the form of conventional threads arranged peripherally on an axially displaceable washer 410, and a helical compression spring 412 that is arranged between the threaded washer 410 and the second end portion 411 of the milling cutter body 402 where the mounting members 414 of the milling cutter body for mounting of an edged milling insert 418 peripherally on the milling cutter body 402 are located. The mounting members 414 of this embodiment are similarly to the mounting members in the first embodiment. Between the washer 410 and the spring 412, the mass element 422 of this embodiment is arranged. The mass element 422 has a smooth envelope surface and a radial extension corresponding to the internal cross-section of the axial hole 404. The spring 412 is adapted to drive the mass element 422 toward the washer 410 and in the direction of the first end portion 424 of the milling cutter body at which the milling cutter body 402 is mountable in the spindle of the device. The first and second threaded members 406, 408 are adapted to engage with each other and their co-operation together with the action of said spring 412 displace the mass element 422 axially in relation to the milling cutter body 402. The lock members of this embodiment include the first and second threaded members 406, 408 and the spring 412, which together lock the mass element 422 in relation to the milling cutter body 402 in a tuned position. The washer 410 is provided with a recess 426 having, for instance, a hexagonal internal cross-section with which a tool is adapted to engage so as to, by rotation of the washer 410, tune the axial position of the mass element 422, and thereby the natural frequencies of the device.

Starting from the second embodiment, an additional embodiment may be formed by replacing the internal threads of the inner walls of the axial hole by the rack from the first embodiment, by the washer being provided with internal threads in the central recess thereof, and by guiding members for guiding mass elements in a strictly axial direction being arranged similarly as in the first embodiment.

FIG. 8 shows a milling cutter body 502 of a third embodiment of the device, wherein the axial hole 504 of the milling cutter body 502 along essentially the entire axial extension thereof, from the first end portion 506 of the milling cutter body 502 to the second end portion 508 thereof, where the mounting members 510 of the milling cutter body for mounting of an edged milling insert 514 peripherally on the milling cutter body 502 are located, is provided with internal threads 518 constituting the first threaded members 518. The second threaded members 520, which together with the first threaded members 518 form tuning members and locking members, are arranged peripherally on the mass element 522 in the form of external threads. The mass element 522 is provided with an indentation 524 having, for instance, a hexagonal internal cross-section, or another non-circular cross-section, with which a tool is adapted to engage so as to, by rotation of the mass element 522, tune the axial position thereof, and thereby the natural frequencies of the device.

FIG. 9 shows a milling cutter body 602 of a fourth embodiment of the device, wherein the milling cutter body 602 at the first end portion 604 thereof is mountable in a rotatable spindle and is, at the second end portion 606 thereof, provided with mounting members 608 for mounting of an edged milling insert 612 peripherally on the milling cutter body 602. In an axial hole 616 arranged in the milling cutter body 602, the mass element is 618 arranged and has also here a smooth envelope surface and has a radial extension corresponding to the internal cross-section of the axial hole 616, whereby the mass element 618 is radially locked so that its radial motion in relation to the milling cutter body 602 is prevented. The tuning members of this embodiment include driving members in the form of a helical compression spring 620 arranged between the mass element 618 and the second end portion 606 and adapted to drive the mass element 618 toward the first end portion 604. The tuning members include in addition pressurizing members in the form of a pressurizing unit 622 adapted to pressurize the space 623 of the axial hole 616 between the first end portion 604 and the mass element 618 in order to drive the mass element 618 from the first end portion 604 and toward the spring 620 and toward the second end portion 606. The pressurizing unit 622 is adapted to pressurize the axial hole by means of cooling liquid 624 that in addition is used to cool down the cutting zone. The pressurizing unit 622 includes at least one valve 626 connected to the axial hole 616 and a control device 628 for controlling the valve and thereby controlling the inflow of cooling liquid into the axial hole 616 and controlling the pressurizing of the space 623 of the axial hole 616 between the first end portion 604 and the mass element 618.

The milling inserts 418, 514, 612 of the embodiments in FIGS. 7-9 may be provided with cutting edges similarly as described in the embodiment according to FIGS. 3-6.

In the embodiments described above, the mass elements are replaceably arranged in the axial hole, and the respective mass element may be replaced by a mass element of higher or lower weight, a mass element of stiffer or less stiff material, or a mass element having greater or smaller axial extension, in order to afford efficient optimization of the natural frequencies of the respective device, whereby the milling becomes even more efficient.

The tuning members described above are adapted to axially tune and displace the respective mass element in the recess between a first position and a second position, wherein the displacement distance of the mass element between the first and second position is sufficiently great in relation to the axial extension of the milling cutter body for an efficient tuning of the natural frequency of the device by the displacement of the mass element. How great said displacement distance is depends on each specific system, for instance, on how the milling tool, spindle and machine are constructed. The displacement distance should not be negligible, or very small, in relation to the total axial extension of the milling cutter body, since this would mean that the natural frequency of the device is not affected substantially by different axial positioning of the mass elements. According to an advantageous embodiment, for instance, the displacement distance may be at least $1/10$ of the total axial extension of the milling cutter body.

The at least one mass element is adapted to form a mass/weight sufficiently great in relation to the total mass/weight of the milling cutter body for an efficient tuning of the natural frequency of the device by the axial tuning of the mass element. How great the mass of the mass element suitably is depends on each specific system, for instance, on how the milling tool, spindle and machine are constructed. The mass of the mass element should not be negligible, or very small, in relation to the mass of the milling cutter body, since this would mean that the natural frequency of the device is not affected substantially by different axial positioning of the mass elements. According to an advantageous embodiment, for instance, the at least one mass element may form a mass that is at least $1/20$ of the total weight of the milling cutter body.

Figure 10:
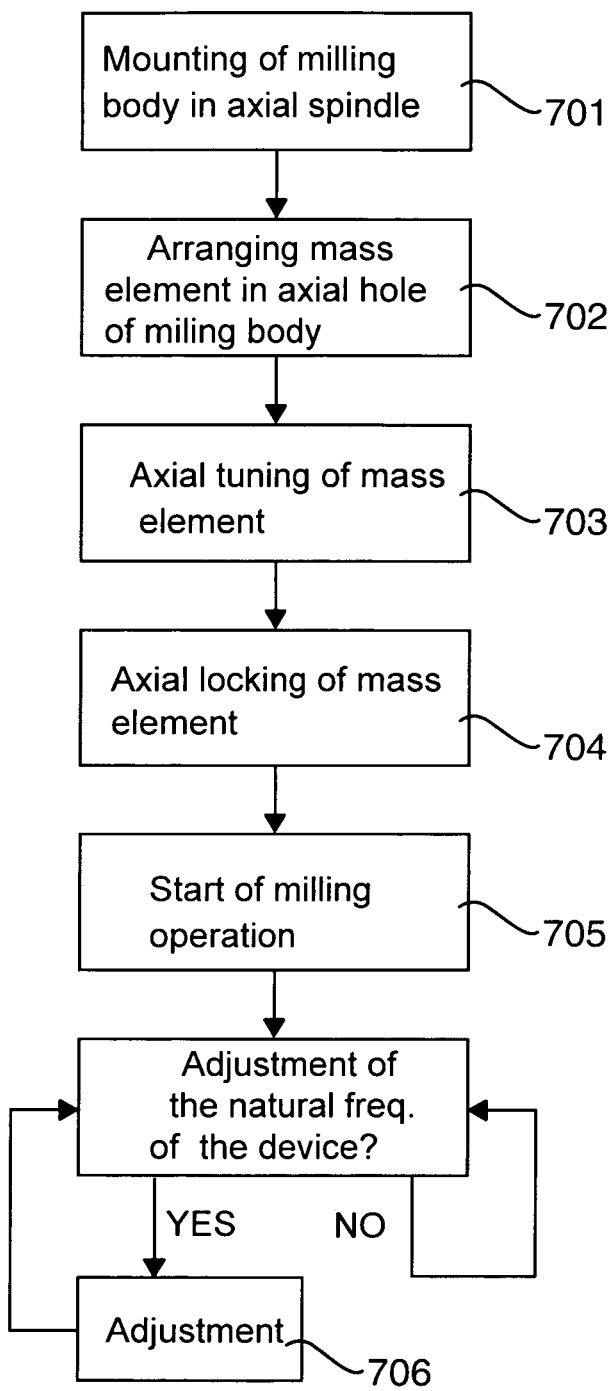
FIG. 10 shows a flow chart that illustrates aspects of the method.

FIG. 10 shows a flow chart that illustrates aspects of the method in milling of materials, wherein the fourth embodiment of the device described above including pressurizing members is utilized, the method comprising the following steps: the milling cutter body is mounted at the first end portion in a rotatable spindle, at 701. One or more mass elements that constitute a considerable mass in relation to the mass of the milling cutter body are arranged in the axial hole of the milling cutter body, at 702, the mass element being replaceably arranged in the axial hole. By the fact that the radial extension of the mass element corresponds to the internal cross-section of the axial hole, the mass element is radially locked in relation to the milling cutter body because the mass element is inserted into and received by the axial hole, so that the radial motion of the mass element in relation to the milling cutter body is prevented. The axial position of the mass element in relation to the milling cutter body is tuned, at 703, by decreasing or increasing the liquid pressure in the space between the mass element and the first end portion, for the tuning of the natural frequency of the device, which results in the mass element being displaced a certain displacement distance from a first position to a second position. The displacement distance of the mass element between the first and second position is sufficiently great in relation to the axial extension of the milling cutter body for optimum tuning of the natural frequency of the device by the displacement of the mass element (refer to the ranges indicated above). The mass element is axially locked in relation to the milling cutter body in a tuned position, at 704, by means of lock members included in the device, wherein the axial locking means that the axial displacement of the mass element in relation to the milling cutter body is prevented, in order to optimize the natural frequency of the device for the milling operation in question, whereupon the milling operation is started, at 705, with an optimum combination of axial cutting depth and spindle speed. The at least one mass element is brought to form such a mass that an optimum tuning of the natural frequency of the device is obtained for the milling operation in question (refer to the ranges given above). If required, the natural frequencies of the device may be adjusted when running, at 706, by increasing or decreasing the liquid pressure in the space between the mass element and the first end portion, by which the axial position of the mass element is adjusted.

The invention shall not be considered to be limited to the embodiments illustrated above but may be modified and altered in many ways within the scope of the accompanying claims.

Accordingly, it is possible to apply the invention to milling tools having a plurality of milling inserts, for example, exchangeable milling inserts, even if it, in the embodiments above, only has been described as milling cutter bodies provided with one milling insert. In such a case, the plurality of milling inserts may be tangentially spaced-apart, but also be arranged on different axial levels in the milling cutter body. Furthermore, it is also possible to apply the invention to the type of milling tools that are composed of two parts, viz. a milling cutter body and a head, which is detachably connected with the body and thereby replaceable, and in which the requisite cutting edges are included.

Although described in connection with preferred embodiments thereof, it will be appreciated by those skilled in the art that additions, deletions, modifications, and substitutions not specifically described may be made without departure from the spirit and scope of the invention as defined in the appended claims.

The invention claimed is:

1. A device for milling of materials comprising a milling cutter body having a first end portion and an opposite second end portion, the milling cutter body at the first end portion being connectable to a rotatable spindle or holder and at the second end portion being provided with at least one cutting edge or mounting member for mounting of at least one milling insert having at least one cutting edge, the milling cutter body defining a longitudinal axis, which extends through the first and second end portions, and being provided with an axial recess and at least one mass element arranged in the recess, wherein the mass element is axially tunable in relation to the milling cutter body by means of tuning members included in the device for the tuning of the axial position of the mass element in relation to the milling cutter body and thereby tuning of the natural frequency of the device, wherein the mass element is axially locked in relation to the milling cutter body in a tuned position by means of lock members included in the device for axial locking of the mass element so that there is no axial displacement in relation to the milling cutter body during the milling operation, in order to optimize the natural frequency of the device for the milling operation in question, and wherein the mass element is radially locked in relation to the milling cutter body by means of lock members included in the device for radial locking the mass element so that there is no radial motion in relation to the milling cutter body.

2. The device according to claim 1, wherein the recess is adapted to receive two or more mass elements, and wherein each mass element is axially tunable and axially lockable by means of said tuning members and lock members.

3. The device according to claim 1, wherein the mass element is replaceably arranged in the recess.

4. The device according to claim 1, wherein the recess embraces an axial hole.

5. The device according to claim 4, wherein the axial hole is provided with an opening at the first or second end portion for feeding in and feeding out the mass element.

6. The device according to claim 4, wherein said tuning members comprise a driving member arranged in the axial hole between the mass element and one of the end portions and adapted to drive the mass element toward the opposite end portion, and pressurizing members adapted to pressurize the space of the axial hole between the opposite end portion and the mass element in order to drive the mass element from the opposite end portion.

7. The device according to claim 6, wherein said pressurizing members are adapted to pressurize the axial hole by means of liquid.

8. The device according to claim 6, wherein the driving member is arranged between the second end portion and the mass element, and said pressurizing members are adapted to pressurize the space of the axial hole between the mass element and the first end portion.

9. The device according to claim 1, wherein said tuning members comprise first threaded members anchored and axially locked in the milling cutter body, and second threaded members that, together with the mass element, are axially displaceable in relation to the milling cutter body, the first and second threaded members engaging each other and their co-operation displacing the mass element axially in relation to the milling cutter body.

10. The device according to claim 9, wherein said tuning members comprise a bar that extends axially in the recess, the bar being provided with the first threaded members, being rotatably anchored in the milling cutter body, and being axially rotatable in relation to the milling cutter body.

11. The device according to claim 9, wherein the inner wall of the recess is provided with the first threaded members.

12. A method for milling of materials, wherein a milling cutter body comprises a first end portion and an opposite second end portion, the first end portion connected to a rotatable spindle or holder and the second end portion being provided with at least one cutting edge or mounting member for mounting at least one milling insert having at least one cutting edge, and the milling cutter body defines a longitudinal axis, which extends through the first and second end portion, and is provided with an axial recess, wherein the method comprises the following steps:

arranging at least one mass element in the recess, tuning of the axial position of the mass element in relation to the milling cutter body by means of tuning members included in the device for the tuning of the natural frequency of the device, axial locking of the mass element in relation to the milling cutter body in a tuned position by means of lock members included in the device, by which there is no axial displacement of the mass element in relation to the milling cutter body during the milling operation, in order to optimize the natural frequency of the device for the milling operation in question, and radial locking the mass element in relation to the milling cutter body by means of lock members included in the device so that there is no radial motion in relation to the milling cutter body.

13. The method according to claim 12, wherein two or more mass elements are arranged in the recess, in that the axial position of each mass element in relation to the milling cutter body is tuned, and in that each mass element is locked in relation to the milling cutter body in a tuned position.

14. The method according to claim 12, wherein the mass element is replaceably arranged in the recess.

15. The method according to claim 12, wherein the at least one mass element is brought to form such a mass and the axial position of the mass element is tuned into such a position that an optimum tuning of the natural frequency of the device is obtained for the milling operation in question.

16. The method according to claim 12, wherein said tuning members comprise a driving member arranged in the axial hole between the mass element and one of the end portions and adapted to drive the mass element toward the opposite end portion, and pressurizing members adapted to pressurize the space of the axial hole between the opposite end portion and the mass element in order to drive the mass element from the opposite end portion.

17. The method according to claim 16, wherein said pressurizing members are adapted to pressurize the axial hole by means of liquid.

18. The method according to claim 17, wherein the liquid is used to cool down the cutting zone.

* * * * *